(12) United States Patent
Jain et al.

(10) Patent No.: US 6,385,520 B1
(45) Date of Patent: May 7, 2002

(54) CONTROL STRATEGY AND METHOD FOR INDEPENDENTLY CONTROLLING FRICTION ELEMENT ACTUATORS FOR AN AUTOMATIC TRANSMISSION

(75) Inventors: Pramod K. Jain; Howard Cecil Kuhn, both of Farmington Hills; Ronald Thomas Cowan, Rochester Hills; Bradley Dean Riedle, Northville; Chuanchi Steve Tang, Troy; James M. Merner, Canton, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/636,729

(22) Filed: Aug. 10, 2000

(51) Int. Cl.[7] ............................................. G06F 17/00
(52) U.S. Cl. ......................................... 701/51; 701/58
(58) Field of Search ............................. 701/51, 58, 60, 701/64, 67; 475/127, 296; 477/155

(56) References Cited

U.S. PATENT DOCUMENTS

| | | |
|---|---|---|
| 4,509,389 A | 4/1985 | Vahratian et al. |
| 5,081,886 A | 1/1992 | Person et al. |
| 5,150,297 A | 9/1992 | Daubenmier et al. |
| 5,157,608 A | 10/1992 | Sankpal et al. |
| 5,305,663 A | 4/1994 | Leonard et al. |
| 5,460,582 A | 10/1995 | Palansky et al. |
| 5,646,842 A | 7/1997 | Schulz et al. |
| 5,835,875 A | 11/1998 | Kirchhoffer et al. |
| 6,122,583 A | 9/2000 | Kirchhoffer et al. |

Primary Examiner—William A. Cuchlinski, Jr.
Assistant Examiner—Edward Pipala
(74) Attorney, Agent, or Firm—Frank G. McKenzie

(57) ABSTRACT

A control strategy and method for controlling application and release of friction elements in an automatic transmission to effect gear ratio changes as one friction element is release and another friction element is applied during ratio changes. The transmission has an electronic controller and multiple solenoid regulator valves hydraulically coupled directly to pressure-operated friction elements. Powertrain variables are obtained and processed to calculate gear ratio control parameters derived from desired line pressure for a pressure control valve circuit that communicates with the friction elements. The desired gear ratio is determined for each given set of powertrain variables. Upshifts and downshifts are obtained by releasing one friction element in synchronism with an application of the other friction element, whereby a direct friction element to friction element torque transition is achieved with minimal inertia torque disturbances.

9 Claims, 9 Drawing Sheets

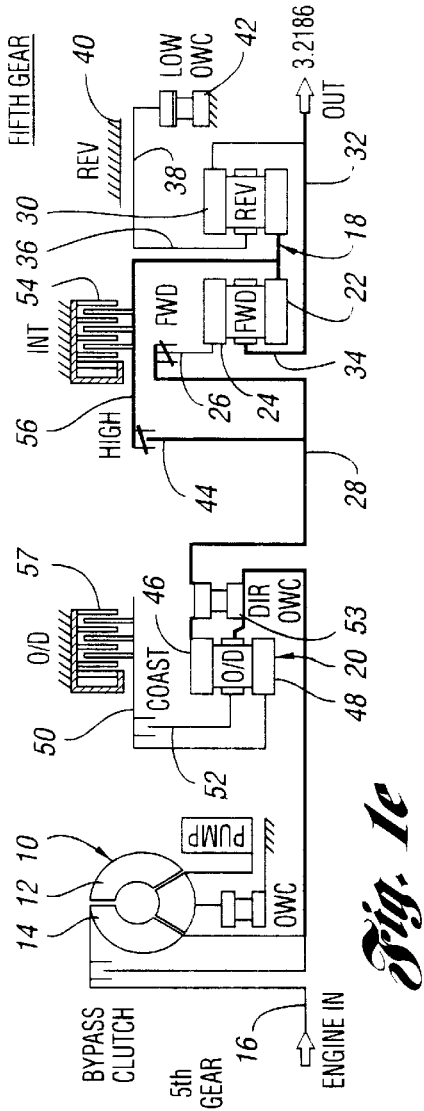

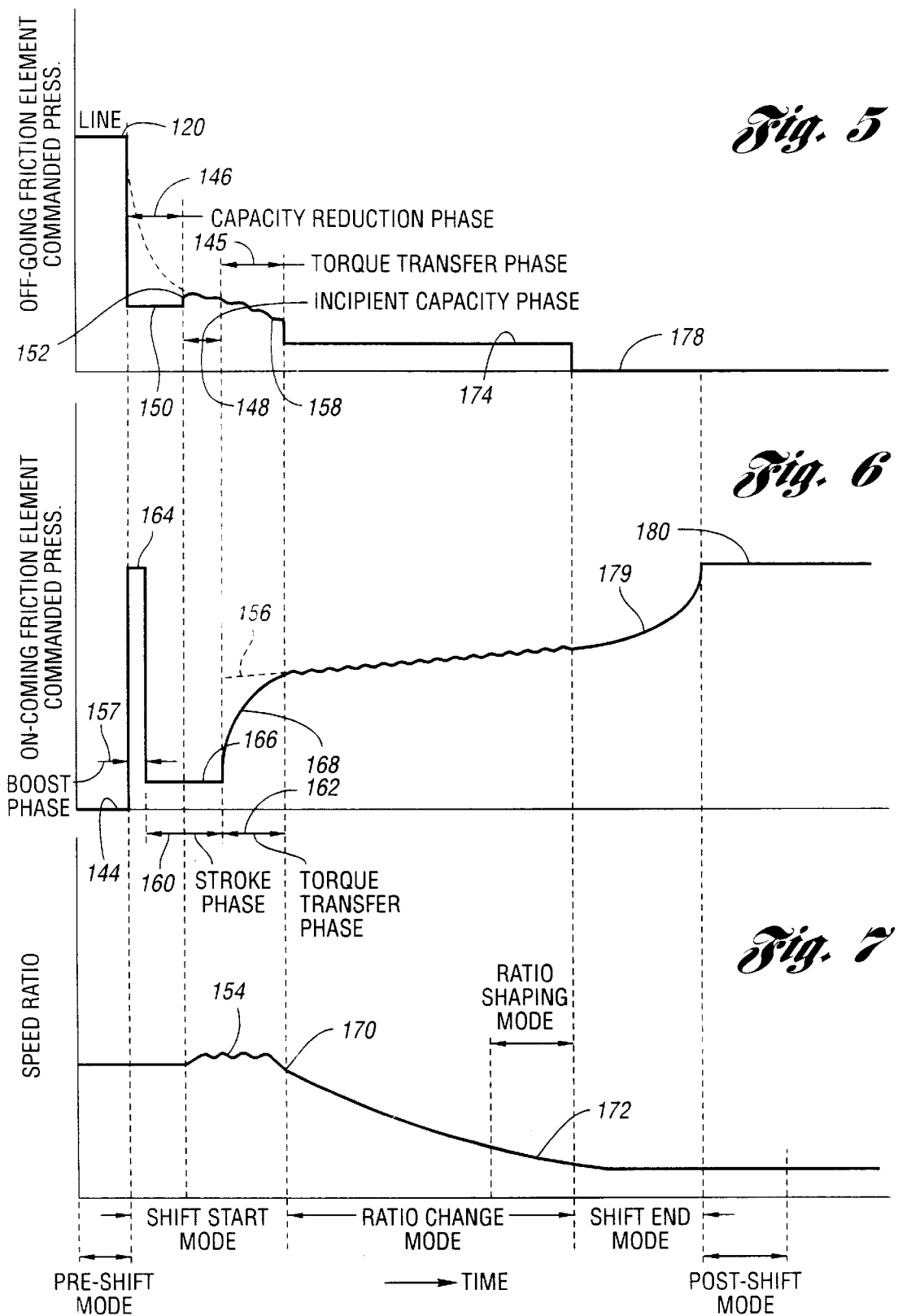

CONTROL STRATEGY AND METHOD FOR INDEPENDENTLY CONTROLLING FRICTION ELEMENT ACTUATORS FOR AN AUTOMATIC TRANSMISSION

TECHNICAL FIELD

A method for electronically controlling ratio shift dynamics of an automatic transmission during a friction-element-to-friction-element ratio change.

BACKGROUND OF THE INVENTION

The strategy and control method of the invention is capable of being used in an electronically controlled automatic transmission for automotive vehicle powertrains for transferring torque from an internal combustion engine to vehicle traction wheels. Automatic transmissions commonly used in vehicle powertrains include multiple ratio gearing wherein reaction torque and relative speeds of the gearing elements are controlled by pressure-operated friction elements; i.e., friction clutches and brakes. Managing torque transfer from the engine to the traction wheels is accomplished by an electronic controller that responds to powertrain variables, including engine variables and driver commands.

Engagement and release of the friction elements is accomplished as an electronic controller develops clutch and brake control pressure so that the speed/torque characteristics of the engine is matched to a desired traction wheel torque.

Driver circuits receive control signals from the controller to actuate solenoid valves. One solenoid valve typically would be used to control circuit pressure delivered to pressure-operated servos for the clutches and brakes. The solenoid valves for effecting control of the pressure-operated clutches and brakes, as well as the solenoid valve for pressure control, may be either variable force solenoids or pulse width modulated solenoids.

The output of the solenoid valves is used to control upshifts and downshifts of a shift valve circuit, which in turn control distribution of regulated circuit pressure (i.e., line pressure) to the pressure-operated clutches and brakes. The clutch and brake actuating pressure usually is modified further by intermediate modulator valves or pressure modifier valves to tailor the actual pressure distributed to the pressure-operated clutches and brakes, depending upon the control parameters required by the system.

It is common practice in the case of a multiple ratio powertrain for automotive vehicles to establish nonsynchronous ratio changes wherein one of a pair of friction elements involved in a ratio change is controlled by an overrunning coupling and the companion friction element involved is actuated by a fluid pressure actuator. Such a shift commonly is referred to as a nonsynchronous shift. Only a single friction element is involved. Such conventional control systems, of necessity, are relatively complex because of the necessity for using multiple shiftable valves between the control solenoid valves and the clutches and brakes. Further, the necessity for using overrunning couplings to control relative motion of the gear elements during ratio changes increases the complexity, size and weight of the transmission.

An example of a conventional automatic transmission having shift solenoids that trigger the operation of shift valves in a control valve circuit for pressure-operated clutches and brakes is disclosed in U.S. Pat. Nos. 5,835,875 and 6,122,583, as well as U.S. Pat. No. 5,460,582.

Another example of a conventional transmission control circuit of this kind, which includes circuit pressure control logic, is disclosed in U.S. Pat. Nos. 5,157,608 and 5,305,663. Each of these prior art patents is assigned to the assignee of the present invention.

In the case of the control system of the '582 patent, the circuit pressure made available to the pressure-operated friction elements is modified further by pressure accumulators, which are needed to tailor the rates of pressure buildup in the actuators for the friction elements to improve ratio shift quality.

DISCLOSURE OF INVENTION

It is an objective of the invention to provide a strategy and method for controlling friction elements of a multiple ratio automatic transmission by providing smooth torque transition between friction elements as one friction element is applied and a companion friction element is released during a direct friction-element-to-friction-element ratio shift. It is possible, using the teachings of the invention, to control each friction element independently, one with respect to another, during gear ratio changes. Solenoid valves for controlling the shifts can be individually calibrated to effect optimum shift quality without affecting the characteristics of the solenoid valves that control other shifts. This simplifies the shift calibration and improves the reliability of the calibration.

The method and strategy of the invention is applicable to a ratio shift that involves a clutch-to-clutch shift, or a clutch-to-band shift, or a band-to-clutch shift, or a band-to-band shift.

A system capable of using the improved method and strategy of the invention includes powertrain sensors for developing input signals for an electronic digital microcontroller. The microcontroller stores input information and executes control logic as it reads sensor outputs. A duty cycle control signal, or a variable force solenoid current signal, is transferred to solenoid control valves for the oncoming friction element and the offgoing friction element during a ratio shift.

If the transmission includes a hydrokinetic torque converter with an impeller connected to the engine and a turbine connected to the transmission input shaft, turbine speed would be one of the sensor inputs as well as engine speed and output shaft speed. Other inputs are throttle position, transmission range selector position, transmission oil temperature, a brake signal and an air conditioning on/off signal. The duty cycle or the variable force solenoid current output is calculated for the oncoming and offgoing friction elements based on the control logic.

The system includes driver circuits that develop input signals for shift control solenoid valves, thereby producing a hydraulic pressure at the oncoming friction element. Likewise, the offgoing friction element pressure is controlled as a smooth torque and speed transition occurs during a gear shift.

The control system used in practicing the method and strategy of the invention has a pressure-controlled circuit including solenoid valve actuators that communicate with the friction elements, which in turn control the gearing to establish plural torque flow paths. The signal input portions of the electronic controller communicate with sensors that measure powertrain variables including engine speed, output shaft speed, engine throttle position, and transmission speed ratio range selection. The strategy includes determining the input variables by reading the output of the sensors, computing friction element capacity reduction for the appropriate friction element on a ratio change, maintaining pressure on the friction elements to initiate engagement, increasing the oncoming clutch pressure during a transfer phase as a function of the ratio of friction element torque to input torque and clutch gain, controlling the oncoming and offgoing clutch pressures to effect a calibrated speed ratio rate of change as a function of the throttle position, and controlling the friction elements using a closed-loop control to obtain a speed ratio change rate of a calibrated value.

The strategy and method of the invention further includes entering an incipient capacity phase after the commanded offgoing clutch reaches a target pressure and controlling the offgoing friction element pressure with a closed-loop control in proportion to the gain in capacity of the oncoming clutch capacity. The engagement of the offgoing friction element is initiated during an upshift to make possible a reversal of the upshift sequence before it is completed. The oncoming friction element pressure is boosted to a maximum pressure during a ratio downshift until the speed ratio value is approximately at the next speed ratio for a given amount of time.

BRIEF DESCRIPTION OF DRAWINGS

FIGS. 1a–1e show in schematic form the gear elements in a five-speed ratio transmission having clutches and brakes that can be controlled using the method and control strategy of the present invention, each figure representing a discrete torque ratio in the forward drive ratio range;

FIG. 1f is a chart showing the clutch and brake application and release pattern for the transmissions illustrated schematically in FIGS. 1a–1e;

FIG. 5 is a plot of the offgoing friction element pressure and timing for a synchronous upshift, the synchronous upshift being divided into five modes;

FIG. 6 is a plot of the oncoming friction element commanded pressure and timing for a synchronous upshift;

FIG. 7 is a plot of the speed ratio and timing for a synchronous upshift;

PARTICULAR DESCRIPTION OF THE INVENTION

Figure 1A:
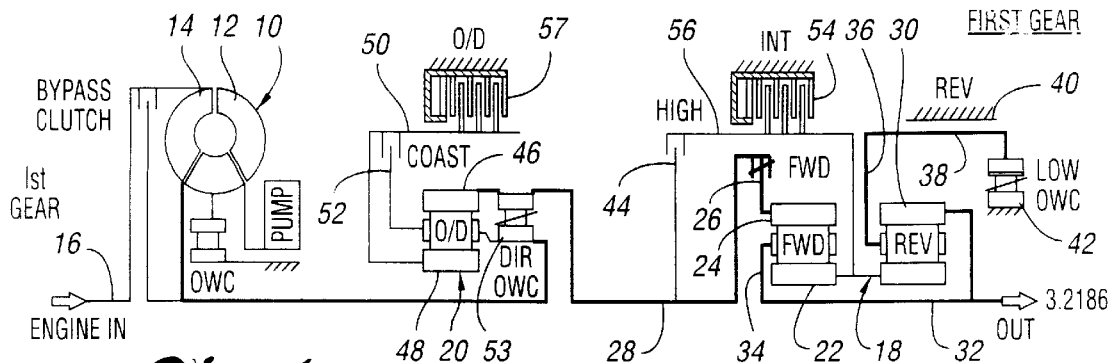
Figure 1B:
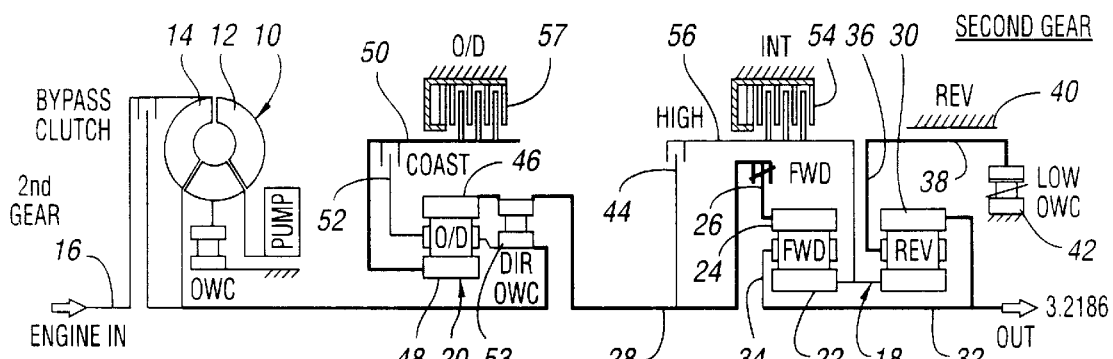

FIGS. 1a–1e show in schematic form the gear elements that are used in an automatic transmission capable of using the method and strategy of the invention. Each of the gears (FIGS. 1a–1e) corresponds to a separate ratio. The lowest ratio, which corresponds to the highest torque multiplication in the forward drive range, is illustrated in FIG. 1a. A hydrokinetic torque converter 10 includes an impeller 12 and a turbine 14, the impeller 12 being connected to the crankshaft of an internal combustion engine shown at 16.

The transmission includes a so-called Simpson gear set 18 and a simple planetary gear set 20. Gear set 18 comprises a pair of planetary gear units with a common sun gear 22. One of the gear units of set 18 has a ring gear 24. Engine torque is distributed through forward drive friction element 26 from torque transfer shaft 28. The second gear unit of the gear set 18 includes ring gear 30, which is connected to torque output shaft 32. The carrier 34 of the first gear unit rotatably supports planet pinions that engage ring gear 24 and sun gear 22. Carrier 34 is also connected to output shaft 32.

Carrier 36 is connected to brake drum 38 for reverse brake band 40. The drum 38 is anchored by overrunning coupling 42 during operation in the lowest gear ratio in the forward drive range, thereby establishing a reaction point.

High speed ratio friction element 44 distributes torque to common sun gear 22 from torque transfer shaft 28 during operation in the fourth and fifth gear ratio.

Gear unit 20 includes a ring gear 46 and a sun gear 48. Ring gear 46 is connected directly to the torque transfer shaft 28. Sun gear 48 is connected to overdrive brake drum 50.

Overrunning coupling 53 connects together ring gear 46 and sun gear 48 during operation in the first and fourth gear ratios.

A coast clutch 52 connects the carrier for gear unit 20 to the sun gear 48 during coast torque delivery.

An intermediate friction element 54 anchors the intermediate brake drum 56 during third speed ratio operation. An overdrive friction element in the form of a disc brake 57 anchors the sun gear 48 of the simple planetary gear unit 20 during operation in the second and fifth gear ratios.

FIG. 1f shows the clutch and brake engagement and release pattern for effecting each of the five forward driving speed ratios corresponding to FIGS. 1a–1e, respectively. The symbol "X" in FIG. 1f indicates an applied friction element. The symbol "C" indicates a friction element that carries braking torque during coast.

The transmission schematically illustrated in FIGS. 1a–1e is an example of a gearing system capable of embodying the strategy of the present invention when ratio changes are made between the third gear ratio and the fourth gear ratio; i.e., a 3-4 upshift and a 4-3 downshift. If a ratio change in any gear system can be accomplished by engaging a friction element and disengaging a companion friction element, that engagement and release event can be controlled by using the strategy of the present invention. Further, if the transmission includes a nonsynchronous ratio shift, as in the case of the transmission disclosed in the prior art patents previously described, the portion of the strategy of the present invention dealing with the engagement of the oncoming clutch or brake also can be used.

Figure 1C:
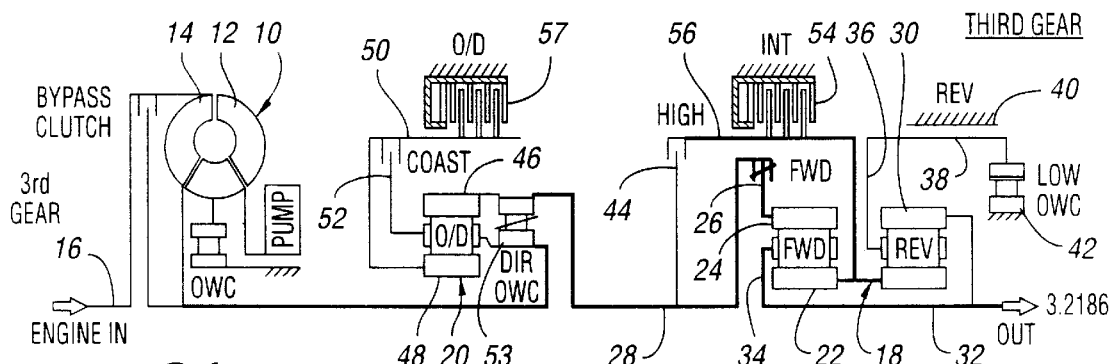

During operation in the third gear ratio, as shown in FIG. 1c, the sun gear 22 is anchored by the friction element 54. Turbine torque from the converter 10 drives the carrier for the simple planetary gear unit 20. Ring gear 46 then is overdriven as driving torque is distributed through the forward friction element 26 to the ring gear 24. Reaction torque on the carrier 36 is distributed through the overrunning coupling 42 to the transmission case.

Figure 1D:
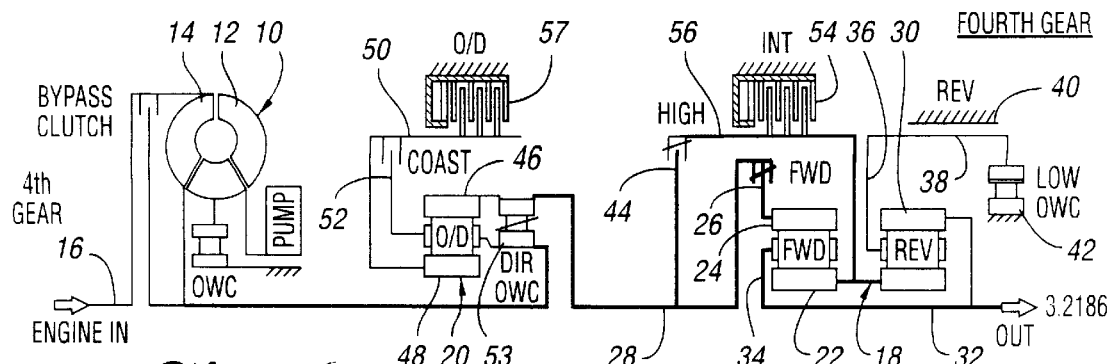

A ratio change from the third gear ratio to the fourth gear ratio, as illustrated in FIG. 1d, is accomplished by disengaging the friction coupling 54 and engaging the friction coupling 44. This permits turbine torque to be distributed directly through the overrunning coupling 52 to the sun gear 22. With the common sun gear 22 acting as a torque output element, the carrier 34 drives the output shaft 32 at a higher speed ratio.

Figure 2:
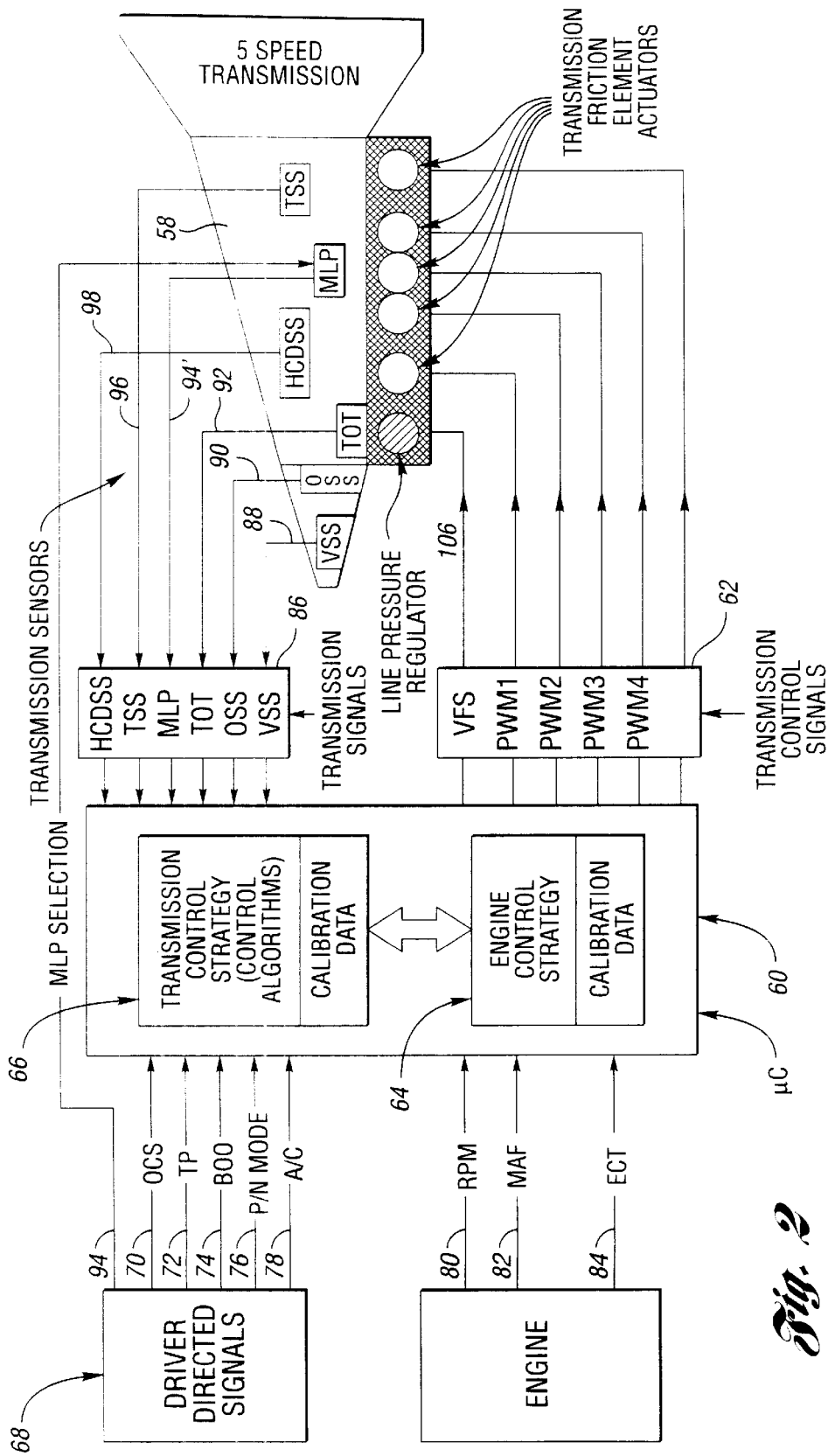
FIG. 2 is an overall system block diagram of a powertrain incorporating the invention.

FIG. 2 shows the overall powertrain system. It comprises a multiple ratio transmission 58 with five forward driving speed ratios. The powertrain system of FIG. 2 includes an electronic, digital microcomputer 60 that controls both the engine 16 and the transmission 58.

The transmission has independent control of the friction elements without valve elements between the friction element actuators and the controller, as in prior art transmission control systems.

The signals developed by the microcomputer 60 are designated at 62. These signals are distributed to the hydraulic control unit, which includes the transmission friction element actuators. The signals are designated by the legends PWM1, PWM2, PWM3 and PWM4. A separate signal VFS is used to control the line pressure regulator.

Although the transmission friction element signals indicated in FIG. 2 are pulsewidth modulated pressure signals developed by pulsewidth modulated solenoid valves, the invention may be practiced as well using variable force solenoid valves, as previously explained.

The engine control strategy for engine 16 is schematically represented in block diagram form at 64. It includes both calibration data and engine control algorithms. The transmission control strategy of the present invention is included in microcomputer portion 66.

Driver-selected powertrain signals, schematically shown in block diagram form at 68, are received by the microcomputer 60. These include a throttle position signal from a throttle position sensor as shown at 72, an overdrive cancel switch signal 70, a brake on/off signal as shown at 74, a park/neutral mode sensor signal as shown at 76, and an air conditioner on/off signal as shown at 78. The driver also selects a manual lever position, which results in a control signal 94 distributed to the transmission 58.

The engine control signals distributed to the microcomputer 60 include engine speed, as indicated at 80, a mass air flow sensor signal, as indicated at 82, and an engine coolant temperature signal, as shown at 84.

The transmission signals developed by sensors in the hardware for transmission 58 are indicated in block diagram form at 86. These include a vehicle speed signal 88, an output shaft speed signal 90, a transmission oil temperature signal 92, a manual level position signal 94' (which is an indicator of the actual manual lever position signal 94 commanded by the driver, a transmission turbine speed sensor signal 96, and a high clutch drum speed signal 98. These signals are described in U.S. Pat. No. 5,835,875, previously identified. Reference may be made to that patent, as well as to the other patents identified above, for the purpose of supplementing this description. The disclosures of those prior art patents are incorporated in this description by reference.

Figure 2A:
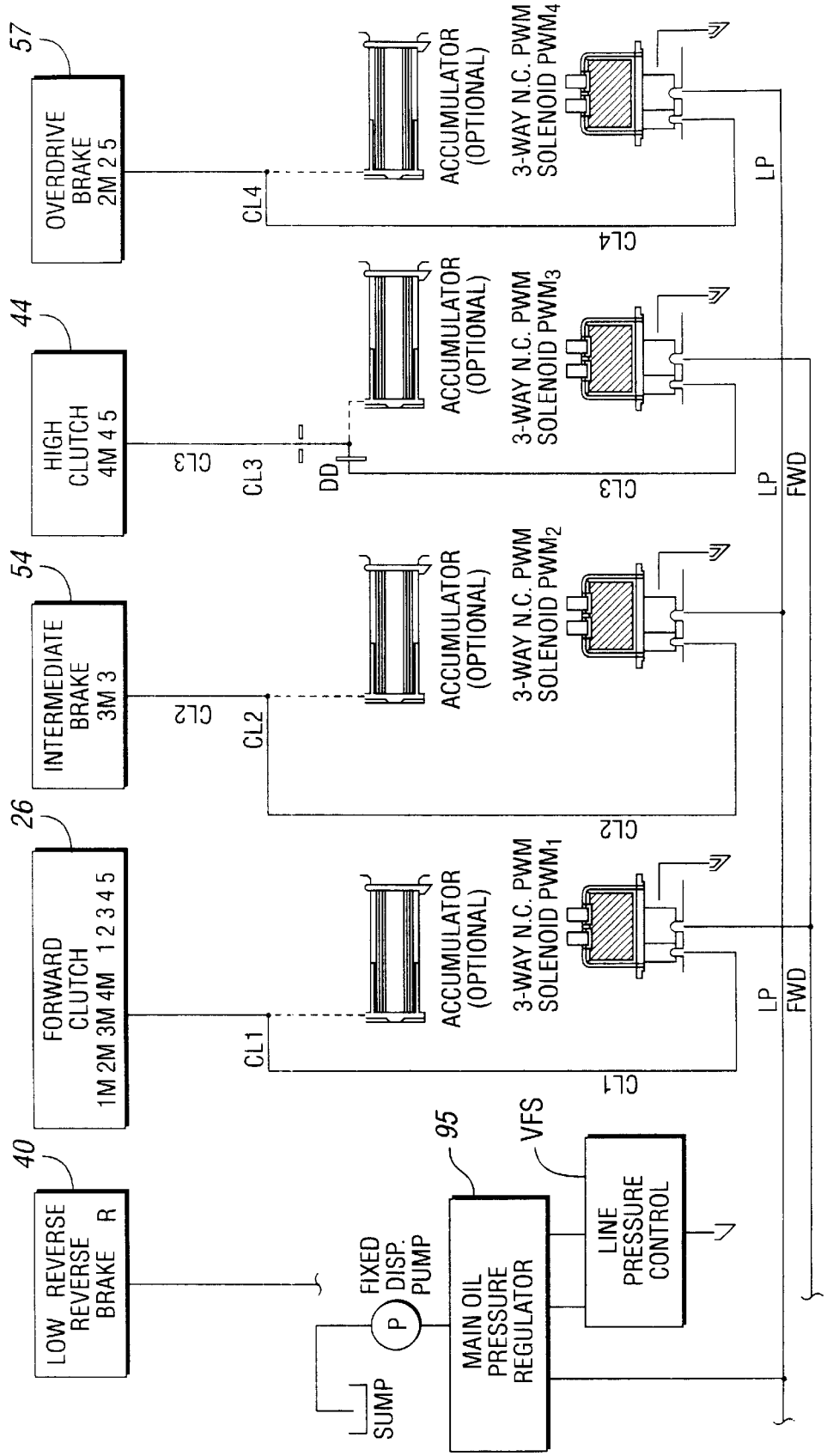
FIG. 2a is a schematic diagram of a portion of the control valve system for the transmission of FIGS. 1a–1e.

FIG. 2a is a schematic valve diagram showing in block form the low/reverse brake 40, the forward friction element 26, the intermediate brake 54, the high friction element 44, and the overdrive brake 57. The solenoid valves for controlling the friction elements are shown at $PWM_1$, $PWM_2$, $PWM_3$, and $PWM_4$. The line pressure solenoid valve is shown at VFS.

The main oil pressure regulator valve 95 is controlled by the line pressure control valve VFS.

Accumulators are shown for each of the friction elements 26, 54, 44 and 57. These accumulators may be used as an option to smooth the ratio changes. Each accumulator has a spring-biased piston in an accumulator chamber that is subjected to friction element pressure. The piston is stroked as the friction element pressure rises, but it does not bottom out as the friction element capacity rises.

It should be noted that the separate solenoid valves for each friction element communicate directly with the individual friction elements without intervening valves, such as shift valves, usually used in control valve systems for automatic transmissions. The separate solenoid valves are hydraulically coupled to their respective friction element actuators. Pressure modifier valves may be used between the solenoid valves and their respective friction element actuators to amplify flow or to extend the range of the actuator pressure variation, but the actuators and the solenoid valves are directly hydraulically coupled nonetheless.

Figure 3:
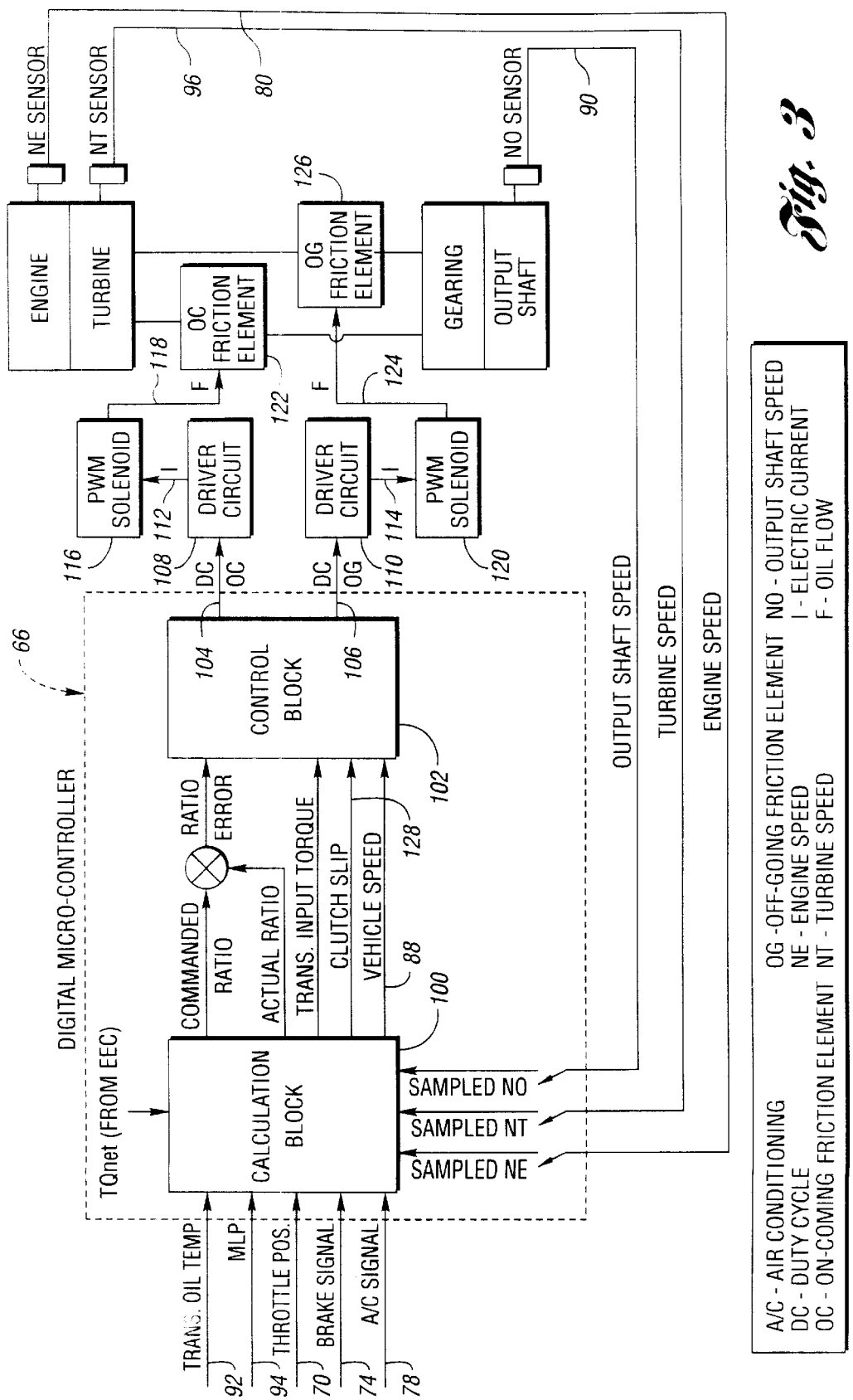
FIG. 3 is a block diagram of the shift control system using the method and strategy of the invention.

FIG. 3 is a block diagram of the overall shift control system. It includes digital microcontroller 66, which contains the transmission control strategy for the invention. The controller 66 has a calculation block 100 and a control block 102. Calculation block 100 receives an engine output torque signal, identified in FIG. 3 as $TQ_{net}$, from the engine control strategy portion of the microcomputer 60.

The microcontroller 66 receives input from the various sensors and executes the control logic to develop duty cycle control signals for the oncoming friction element and the offgoing friction element, as indicated respectively at 104 and 106. As indicated previously, this is done on a real-time basis. Electronic driver circuits 108 and 110, respectively, convert the oncoming duty cycle and the offgoing duty cycle to current signals as shown at 112 and 114. Pulsewidth modulated solenoid 116 produces oil flow to the oncoming clutch 122, as shown at 118. Similarly, pulsewidth modulated solenoid 120 produces oil flow at 124 to the offgoing clutch 126.

Figure 4:
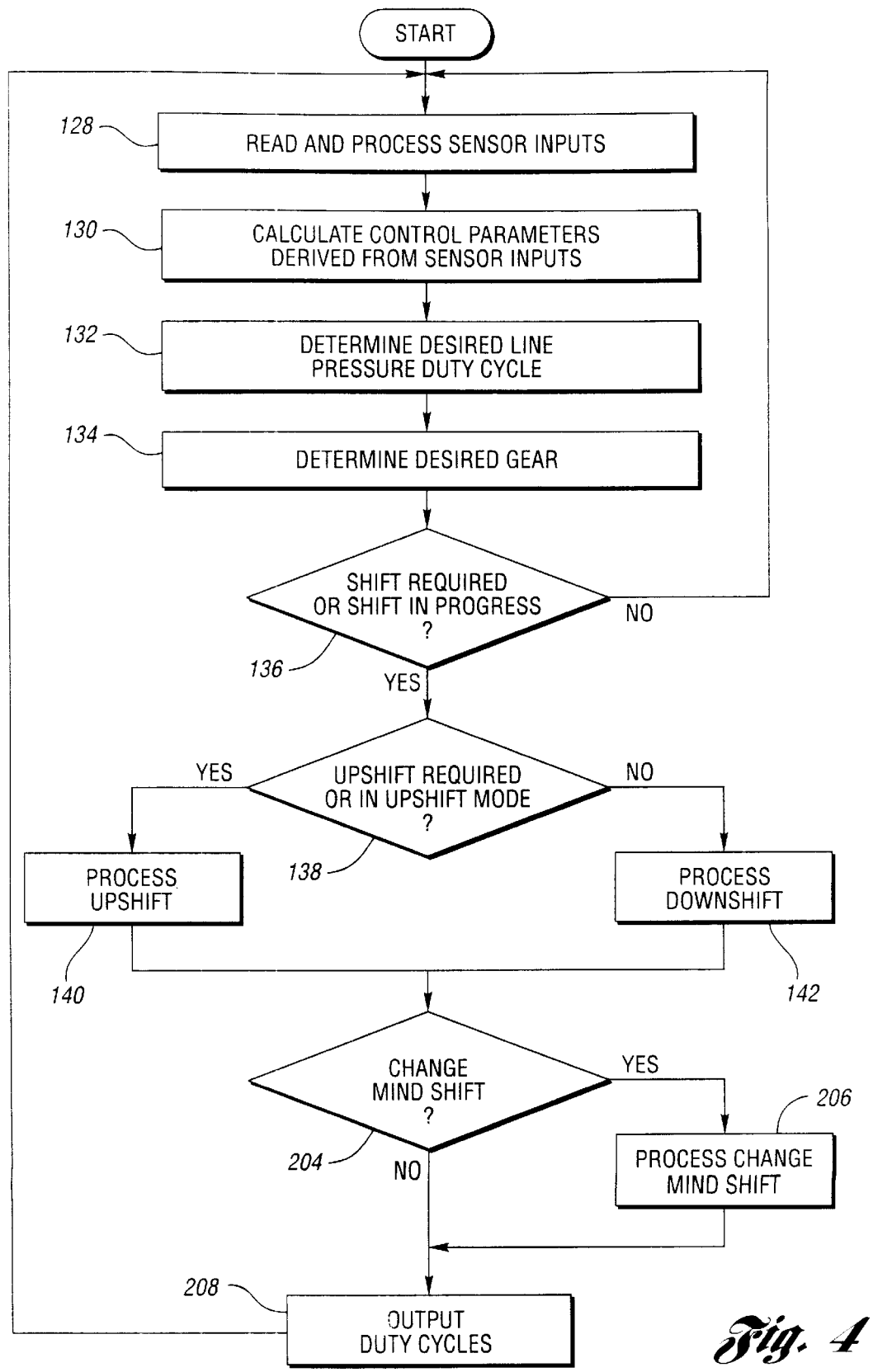
FIG. 4 is the overall algorithm for achieving ratio changes using the direct electronic shift control of the invention.

The overall control logic is summarized in the flow chart of FIG. 4. The control routine involves a series of steps, the first of which is step 128, which involves reading and processing of the sensor input signals previously described. Using that data, the control parameters derived from the sensor inputs are calculated at step 130. Vehicle speed is calculated as a product of output shaft speed times a conversion constant. The speed ratio across the gearing is calculated as the turbine speed divided by the output shaft speed. Transmission input torque is calculated from engine parameters, as shown at $TQ_{net}$ in FIG. 3. Clutch slip is determined from the turbine speed at 96 and the output shaft speed at 90. Clutch slip is indicated in FIG. 3 at 128.

Line pressure required by the friction element actuators is determined as a function of the current gear, the transmission input torque $TQ_{net}$, and the vehicle speed, the latter being directly related to output shaft speed. This relationship between line pressure, current gear transmission input torque and vehicle speed is stored in memory for the digital microcontroller 66. It may be in the form of a lookup table.

The step for the control routine of FIG. 4 where desired line pressure is calculated is shown at 132. In the schematic diagrams of FIGS. 2 and 2a, the line pressure regulator receives the output of variable force solenoid VFS, as shown at 106.

As the control routine of FIG. 4 continues, the desired gear is determined at step 134. The desired gear is determined from throttle position, vehicle speed, transmission range selector position, and the current gear. These variables are contained in performance curves or shift point curves that are stored in the memory of the digital microcontroller 66. The shift schedule is the relationship of throttle position versus speed for each gear.

The routine of FIG. 4 proceeds to step 136 where an inquiry is made as to whether a shift is required or whether a shift is in progress. A determination that a shift is required is made if the current gear is not the same as the desired gear based on a given shift schedule.

The routine of FIG. 4 continues to step 138, where it is determined whether an upshift is required; that is, it is determined whether the current gear is lower than the desired gear. Alternatively, it is determined at step 112, whether an upshift currently is in progress. If an upshift is required, the upshift logic is processed as indicated at step 140. If a downshift is required, the downshift logic is processed as shown at step 142.

If an upshift is to be processed, the upshift event is divided into five modes, which are indicated in FIGS. 5, 6 and 7. These five modes are the preshift mode, the shift start mode, the ratio change mode, the shift end mode, and the post-shift mode. FIG. 5 is a plot of shift time during which the five modes are executed versus the offgoing friction element commanded pressure. The offgoing friction element is shown at 126 in FIG. 3.

FIG. 6 is a plot corresponding to the plot of FIG. 5, but which shows the relationship between the time modes and the oncoming friction element commanded pressure. The oncoming friction element is shown in the schematic system diagram of FIG. 3 at 122.

FIG. 7 is a plot of the speed ratio versus the timing of the various shift modes.

All of the calibrations involved in an upshift and in a downshift are unique for each shift. Although ratio changes between the second ratio and the third ratio are described, the invention may be practiced also with ratio shifts between other ratio pairs in other transmission arrangements. The control logic described herein would be the same regardless of the specific gear ratio change that is taking place.

The pre-shift mode, as shown in FIGS. 5–7, is of a fixed duration. It is used primarily to allow sufficient time for line pressure transient responses following a command for a ratio change. The pre-shift mode also is used for pre-staging any other friction elements that may be required for a nonsynchronous shift. In the particular gearing arrangement now being described with reference to FIGS. 1a–1e, engagement or release of other friction elements is required for a nonsynchronous shift from the second ratio to the third ratio or from the third ratio to the second ratio.

During the pre-shift mode, the oncoming friction element pressure is set to zero, as indicated at 144 in FIG. 6. The offgoing friction element pressure to set to line pressure, as indicated at 146 in FIG. 5.

The pre-shift mode is followed by the shift start mode seen in FIGS. 5, 6 and 7. In the shift start mode for an upshift, there are different phases for the offgoing friction element and the oncoming friction element. The offgoing friction element, which could be either a brake or a clutch as explained previously, goes through two phases; i.e., the capacity reduction phase 146, seen in FIG. 5, and the closed loop incipient capacity phase 148 seen in FIG. 5. In the capacity reduction phase 146, the torque capacity of the clutch is quickly reduced from full line pressure torque to a torque value slightly above the capacity necessary to hold engine torque. This lower torque capacity is shown in FIG. 5 at 150. The offgoing clutch pressure is increased from the commanded line pressure at 150 to the pressure at 152, which is calculated from engine torque using the following equation:

$$PR\_CMDog=[TQ\_TRANS*MLTQog/GAINog+PRSTog-CFog*(NT/1000)^2]*FNMLTEog(tempr), \quad (1)$$

where

| | |
|---|---|
| TQ_TRANS | = transmission input torque (at the turbine) |
| MLTQog | = ratio of clutch torque to input torque |
| GAINog | = clutch gain |
| PRSTog | = clutch stroke pressure |
| NT | = turbine speed |
| Cfog | = centrifugal force speed to pressure conversion constant |
| MLTEog | = multiplier for temperature compensation |

The parameters indicated in Equation 1 are unique parameters for each shift. For example, a 2-3 shift would have a different set of parameters than a 3-4 shift in a different gearing arrangement design for direct electronic shift control. Transmission oil temperature compensation for the calculated pressure is accomplished by multiplying the calculated pressure by a factor that is a function of the transmission oil temperature.

A low pressure is commanded as shown at 150 to decay the offgoing clutch friction element pressure quickly to a pressure only slightly higher than stroke pressure. Assuming a first order friction element system, where the pressure decays exponentially as shown by the dotted line in FIG. 5, a friction element time constant is used to estimate the friction element pressure during each control loop of the digital microcontroller. When the estimated pressure reaches the pressure computed in accordance with Equation 1 above, the capacity reduction phase is ended and the incipient capacity phase 148 is begun.

The offgoing friction element enters the incipient capacity phase after the commanded pressure reaches the capacity reduction phase target pressure shown at 152 in FIG. 5, which is slightly above the pressure shown at 150. The pressure for the offgoing friction element is controlled using a closed loop proportional-integral-derivative controller (PID). Such controllers are well known in the art. The pressure controls the speed ratio to a level that is slightly above the previous gear ratio. This is indicated at 154 in the plot of FIG. 7.

The oncoming friction element gains capacity during the torque transfer phase 145, as shown in FIG. 6 at 156, where the capacity plot has a positive slope. A cross-link torque term is used to reduce the offgoing friction element capacity proportionally as the oncoming clutch pressure increases. The decrease in the offgoing friction element pressure is shown at 158 in FIG. 5. Further, compensation is made for any significant change in input torque. This compensation is made by a torque feed forward term. Thus, the clutch pressure is determined by the following equation:

$$PR\_OGnew=[PR\_OGold+\Delta P(PID)+\Delta P(TQ\_FF)+\Delta P(Cross\_link)*FNMLFFGN(tempr)]*FNMLTEog(tempr), \quad (2)$$

where

| | |
|---|---|
| FNMLTEog | = multiplier for temperature compensation |
| FNMLFFGN | = gain multiplier for the cross-linked torque |

The $\Delta P(PID)$ term is a delta pressure calculated from the PID controller as follows:

$$\Delta P(PID)=Kc*[Kp*(RT\_ERR\_T0-RT\_ERR\_T1)+Ki*RT\_ERR\_T0+Kd*(RT\_ERR\_T0-2*RT\_ERR\_T1+RT\_ERR\_T2)], \quad (3)$$

where

| | |
|---|---|
| Kc | = PID controller overall gain |
| Kp | = PID controller proportional gain |
| Ki | = PID controller integral gain |
| Kd | = PID controller derivative gain |
| RT_ERR | = commanded ratio - actual ratio |
| RT_ERR T0 | = control error of current loop |
| RT_ERR T1 | = control error of previous loop |
| RT_ERR T2 | = control error of two loops previous |

$\Delta P(TQ\_FF)$ is a delta pressure derived as a torque feed forward open loop correction. It is calculated as follows:

$$\Delta P(TQ\_FF)=\Delta TQ\_trans*MLTQog/GAINog \quad (4)$$

$\Delta P(Cross\_link)$ is a delta pressure derived as a cross-linked torque open loop correction. It is calculated as follows:

$$\Delta P(Cross\_link)=(PR\_lead/lag\_oc-PRSTog)*(GAINoc/MLTQoc)/(GAINog/MLTQog), \quad (5)$$

where $$PR\_lead/lag\_oc=PR\_ESToc-(\tau\_og/\tau\_oc)*(PR\_CMDoc-PR\_ESToc)$$

$$PR\_ESToc=C*PR\_CMD\_old\_u+(1-C)*PR\_ESTold$$

$$C=1/(1+\tau\_oc/T)$$

It should be noted that the suffix "oc" for terms used in the preceding equation, as well as in subsequent equations, refers to the overrunning friction element. Likewise, the suffix "og" refers to the offgoing friction element.

The term $\Delta P (TQ\_FF)$ is an indicator of the change in input torque. That term is used to convert torque to pressure as indicated above.

The term PR_lead/lag_oc is the oncoming friction element pressure that is used to compensate for the responses of the oncoming friction element and the offgoing friction element using a lead/lag filter. The term PR_ESToc is the oncoming friction element estimated pressure, assuming a first order system.

The friction element characteristics for the oncoming friction element are shown in FIG. 6. The oncoming friction element has three phases; i.e., the boost phase 157, the stroke phase 160, and the torque transfer phase 162. During the boost phase, pressure to the oncoming friction element is commanded to a maximum value for a short period of time, as shown at 164 in FIG. 6. This is done to fill the actuator for the friction element and to raise the pressure to a value almost equal to the value that will cause stroking of the offgoing friction element. The length of time in the boost phase is a function of the line pressure. It is temperature compensated.

During the stroke phase, the commanded pressure for the oncoming friction element is set to the friction element stroke pressure for a calibratable time, as shown at 166. The stroke pressure moves the mechanical parts of the oncoming friction element so that the friction element will be almost capable of transmitting torque.

During the torque transfer phase 162, the stroke phase will have been completed. At the start of the torque transfer phase, the pressure at 156 is calculated in accordance with the following equation:

$$PR\_CMDoc=\{[TQ\_TRANS+TQ\_i\alpha*FRTQOC]*MLTQoc/GAINoc+PRSToc-CFoc*(NT/1000)^2\}*FNMLTEoc(tempr), \quad (6)$$

where

| | |
|---|---|
| Cfoc | = conversion constant for centrifugal force compensation |
| TQ_iα | = inertial torque based on inertial change in turbine speed, and desired ratio change time {= CONST*inertia*ΔNT/ratio change time} |
| FRTQoc | = fraction of transmission torque adder |
| FNMLTEoc | = multiplier for temperature compensation |

The unfiltered commanded pressure for the oncoming friction element then is slowly increased as shown at 156 in FIG. 6 in accordance with the following equation:

$$PR\_CMDoc=[PR\_CMDoc\_old+PRSLTT+\Delta TQ\_trans*MLQoc/GAINoc]*FNMLTEoc \quad (7)$$

The filtered friction element pressure commanded for the oncoming friction element uses a time constant, which results in a fast pressure buildup if the time constant is low and a higher rate of pressure buildup if the time constant is high. This pressure buildup is shown in FIG. 6 at 168. In this way, the shape of the curve at 168 in FIG. 6 is determined.

A smooth torque transfer between the oncoming friction element and the offgoing friction element is achieved because the offgoing friction element, as previously mentioned, maintains the speed ratio at a level just above the previous gear ratio, as shown at 154.

Torque transfer to the oncoming friction element is completed when the offgoing friction element can no longer maintain the ratio to its commanded value, as indicated at 170 in FIG. 7. The shift start mode then ends as the speed ratio drops below the previous gear ratio by a calibratable tolerance for a given amount of time. The change in turbine speed also is monitored. Further, if the change in turbine speed for each controller control loop falls below a calibratable value for a given amount of time, the shift start mode is ended and the ratio change mode is begun. The shift start mode ends when the first of these two events occurs; i.e., the speed ratio drops below the previous gear ratio by a calibratable tolerance for a given amount of time, or the turbine speed for each control loop falls below a calibratable value for a given amount of time.

In the ratio change mode for upshifts, the oncoming friction element pressure and the offgoing friction element pressure are controlled to achieve a desired calibratable speed ratio change rate. When the ratio changes from the previous ratio to the next ratio, the calibratable speed ratio change rate is a function of throttle position for upshifts. There is also a calibratable shaping factor that slows the desired rate of change as the speed ratio approaches the next gear ratio. This shaping factor results in a change in the slope of the ratio change mode curve in FIG. 7, as shown at 172.

During offgoing friction element control, the commanded pressure is set to the offgoing friction element stroke pressure, as shown at 174 in FIG. 5, to improve the response in case the shift must be aborted or reversed during a change of mind condition.

Pressure on the oncoming friction element, as seen in FIG. 6, is controlled using a closed loop PID controller to control the speed ratio rate of change to a desired calibratable value. This results in the slope indicated in FIG. 7 between the points indicated by reference numerals 170 and 172. Torque feed forward is used to improve the response to changes in transmission input torque. For large changes in torque, a feed forward term using changes in throttle position is used. Provision may be made for desensitizing the closed loop controller in the initial portion of the ratio change mode. When the actual speed ratio is near completion, the shaping function is used at 172 to reduce the desired rate for a smooth ending of the ratio change mode. The oncoming friction element pressure is computed as follows:

$$PR\_CMDoc=\{PR\_CMDoc\_old+\Delta P(PID)*FNFRRB(ctr\_\text{ramp})+ FNPRCO(\Delta TP)+CCPRTF*(\Delta TQ\_\text{TRANS})+ [TQ\_ia(1-FRTRoc)*MLTQoc*FRPRDLoc/\text{GAIN}oc]\}*FNML-TEoc(tempr), \quad (8)$$

where

| | |
|---|---|
| FNFRRB(ctr_ramp) | = multiplier used to reduce the gain of the PID controller for the first few loops, for smooth transition. It is a function of the number of loops from the start of the ratio change mode |
| FNPRCO(ΔTP) | = feed forward term to compensate for sudden large changes in throttle position (which are a precursor to changes of torque) |
| CCPRTF | = constant for torque feed forward term to compensate for changes in input torque. It is activated after TMDYTQ time to allow for torque stabilization during torque modulation |
| FRPRDLoc | = percent increment per loop until pressure needed due to remainder of 1-alpha torque is take care of. Note that a portion of 1-alpha torque is already added during torque transfer phase |
| FNMLTEoc(tempr) | = multiplier for temperature compensation |

The ΔP (PID) term is a delta pressure calculated from the PID controller as follows:

$$\Delta P(PID)=Kc*[Kp*(RTR\_ERR\_T0-RTR\_ERR\_T1)+Ki*RTR\_ERR\_T0+Kd*(RTR\_ERR\_T0-2*RTR\_ERR\_T1+RTR\_ERR\_T2], \quad (9)$$

where

| | |
|---|---|
| Kc | = PID controller overall gain |
| Kp | = PID controller proportional gain |
| Ki | = PID controller integral gain |
| Kd | = PID controller derivative gain |
| RTR_ERR | = commanded ratio rate - actual ratio rate |
| RTR_ERR_T0 | = control error of current loop |
| RTR_ERR_T1 | = control error of previous loop |
| RTR_ERR_T2 | = control error of two loops previous |

The commanded ratio rate as mentioned above is calculated as follows:

$$RTR\_CMD=[(1000/FNTMDSRC(TP)]*FNFRRC(RT\_NRM) \quad (10)$$

where

| | |
|---|---|
| RTR_CMD | = commanded ratio rate |
| FNTMDSRC | = desired time in ratio change mode |
| FNFRRC | = multiplier for shaping factor |
| RT_NRM | = normalized ratio, value changes from 1 to 0 for an upshift |

In the above equation (10), the shaping factor FNFRRC results in the shaping of the ratio change mode curve in FIG. 7 as shown at 172.

The ratio change mode ends when the speed ratio closely approaches the next gear ratio. Optionally, for back-out shifts, the engine fuel can be shut off during the ratio change mode for faster decay of the engine speed.

The shift end mode indicated in FIGS. 5, 6 and 7 is the last stage of the disengagement of the offgoing friction element and the engagement of the oncoming friction element. At this time, the commanded pressure for the offgoing friction element is set to zero, as shown at 178 in FIG. 5. The commanded pressure to the oncoming friction element is increased parabolically, as shown at 179 in FIG. 6, until it reaches a commanded line pressure or a maximum pressure, as shown at 180 in FIG. 6, or until the friction element estimated pressure is very close to the commanded line pressure. This is done to increase the oncoming friction element pressure without a torque bump caused by transitional inertia forces after the oncoming friction element carries most of the torque and does not slip.

The post-shift mode in FIGS. 5, 6 and 7 is of a fixed duration. This mode is used primarily to allow time for the destroking of the offgoing friction element as the oncoming friction element pressure rises to line pressure. It also permits time for post-staging of any friction other than the ongoing and offgoing friction elements that may be required for a nonsynchronous shift if the control logic of the invention is used to control shifts in a nonsynchronous transmission.

A nonsynchronous upshift uses only the oncoming friction element. The oncoming friction element is controlled in the same way as the oncoming friction element in a synchronous upshift, as previously described.

Figure 8:
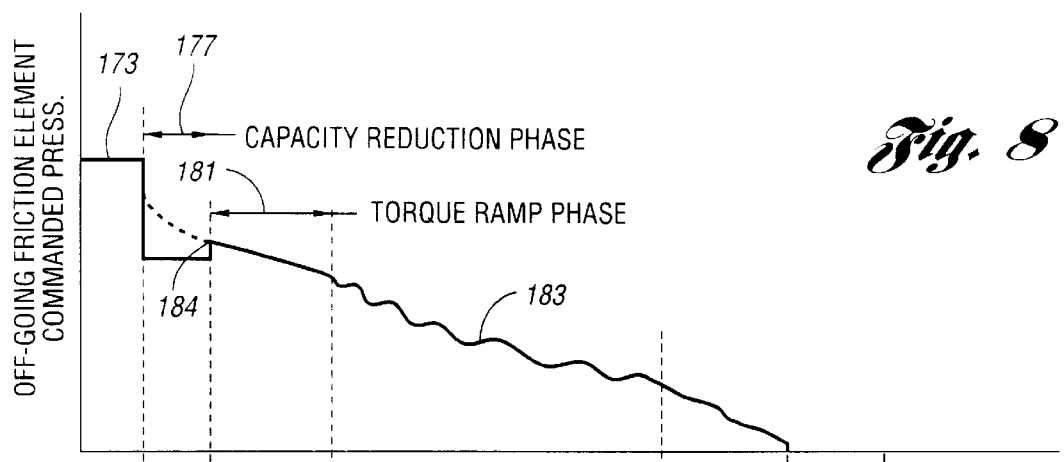
FIG. 8 is a plot of the offgoing friction element commanded pressure and timing for a synchronous downshift using the method and strategy of the invention.
Figure 9:
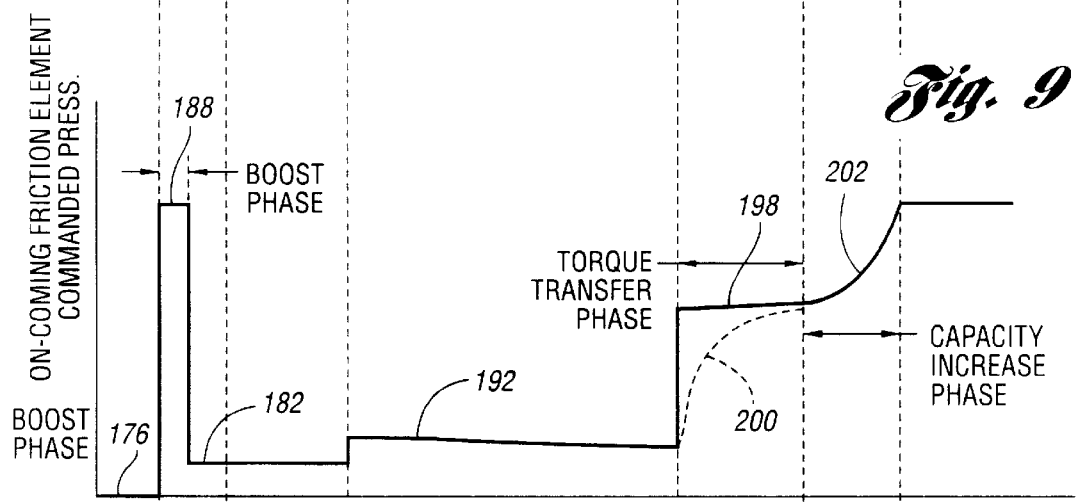
FIG. 9 is a plot of the oncoming friction element commanded pressure and timing for a synchronous downshift.
Figure 10:
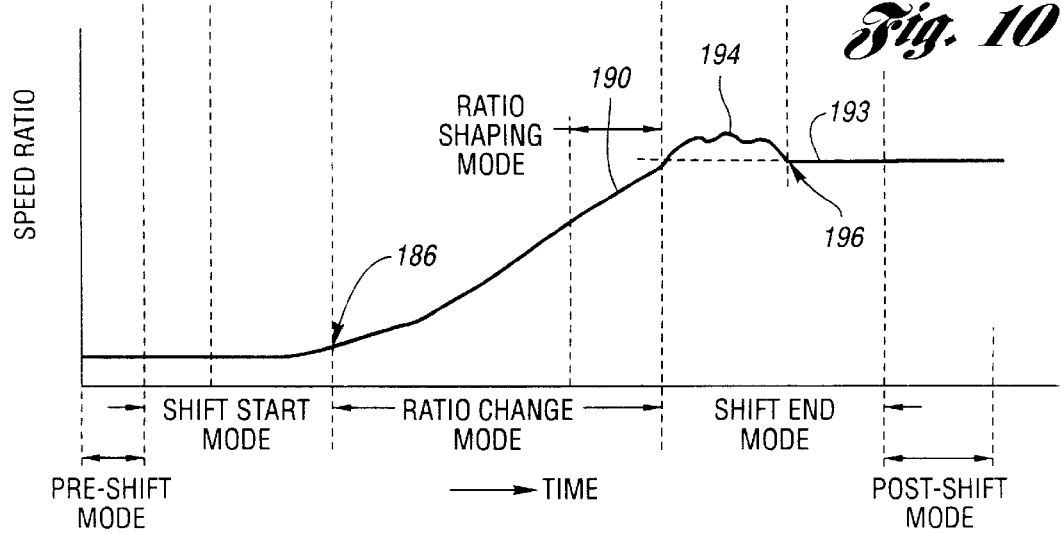
FIG. 10 is a plot of the speed ratio and timing for a synchronous downshift.

FIGS. 8, 9 and 10 show the events that occur during the various timing modes for a synchronous downshift. These modes are the same as the modes previously described with respect to the synchronous upshift. As in the case of a synchronous upshift, the pre-shift mode for a synchronous downshift is of fixed duration, as shown at 173 in FIG. 8. The pre-shift mode is used to provide time for a line pressure transient response. As in the case of a synchronous upshift, it is used also for pre-staging any friction element required during the synchronous downshift other than the friction elements directly involved in the synchronous downshift. For most of the shifts, it is set to zero.

During the pre-shift mode, the oncoming friction element is set to zero, as shown at 176 in FIG. 9, and the offgoing clutch element is set to line pressure, as previously described.

The shift start mode for a downshift consists of different phases for the offgoing friction element and the oncoming friction element. The offgoing clutch has a capacity reduction phase 177, seen in FIG. 8, and a torque ramp phase, seen at 181. During the capacity reduction phase 177, the torque capacity is reduced quickly at the oncoming friction element from full capacity at 188 to a capacity slightly above the capacity necessary to hold the engine torque, as shown at 182. The offgoing friction element pressure is decreased from the commanded line pressure at 173 to a pressure calculated from engine torque using the following equation:

$$PR\_CMDog=\{[TQ\_TRANS+TQ\_i\alpha)*MLTQog/GAINog+PR\_STog-CFog*(NT/1000)^2\}*FNMLTEog, \quad (11)$$

where

| | | |
|---|---|---|
| TQ_TRANS | = | transmission input torque (at the turbine) |
| TQ_iα | = | 1-alpha torque |
| MLTQog | = | ratio of clutch torque to input torque |
| GAINog | = | clutch gain |
| PRSTog | = | clutch stroke pressure |
| NT | = | turbine speed |
| Cfog | = | centrifugal force speed to pressure conversion constant |
| FNMLTEog | = | multiplier for temperature compensation |

This calculated pressure is compensated to account for transmission oil temperature by multiplying it by a factor that is a function of transmission oil temperature (FNMLTEog). In order to decay the offgoing friction element pressure quickly, a low pressure is commanded as shown at 182 in FIG. 9. Assuming a first order system, a clutch time constant is used to estimate the clutch pressure for every control loop of the microcontroller. When the estimated pressure reaches the pressure computed earlier, the capacity reduction phase is ended and the torque ramp phase is initiated.

The offgoing friction element starts the torque ramp phase after the commanded pressure reaches a capacity reduction phase target pressure indicated at 184 in FIG. 8. The torque transfer ramp phase decreases the commanded offgoing friction element pressure every control loop of the microcontroller in accordance with the following equation:

$$PR\_CMDog=PR\_CMDog\_old-PRSLTT+\Delta P(TQ\_FF), \quad (12)$$

where

| | | |
|---|---|---|
| PRSLTT | = | reduction in friction element pressure per loop |

$\Delta P(TQ\_FF)$ is a delta pressure derived as a torque feed forward open loop correction. It is calculated as follows:

$$\Delta P(TQ\_FF)=\Delta TQ\_TRANS*MLTQog/GAINog \quad (13)$$

The offgoing friction element pressure continues its reduction until the friction element begins to slip and the gear ratio rises above the previous gear ratio by a calibratable value (RTTLSS), as shown at 186 in FIG. 10. If the commanded friction element pressure falls below the minimum friction element pressure (PROGMN), the shift start mode will be ended and the shift end mode will be initiated without an intervening ratio change mode. A coasting downshift may cause this condition.

The oncoming friction element control with the characteristics shown in FIG. 9 goes through a boost phase, during which the pressure to the oncoming friction element is commanded to a maximum pressure for a short time. This is shown at 188 in FIG. 9. This is done to permit the oncoming friction element to fill and stroke quickly until it is almost fully stroked. The length of time the oncoming friction element is in the boost phase is a function of line pressure, compensated by transmission oil temperature. After the boost phase, the oncoming friction element pressure is set to the stroke pressure, as shown at 182.

In the ratio change mode for downshifts, the speed ratio rate of change is controlled from the previous gear ratio to the next gear ratio. This is done by controlling the offgoing friction element pressure. The offgoing friction element pressure control uses a closed loop PID controller to control the speed ratio rate; i.e., the slope of the curve shown in FIG. 8, to a desired calibratable value. The calibratable ratio rate is a function of vehicle speed for a downshift. Torque feed forward is used, in the manner previously described for upshifts, to improve the response to changes in transmission input torque during downshifts. For large changes in torque, a feed forward term using change in throttle position is used. Provision is made to desensitize the closed loop controller in the initial portion of the ratio change mode. When the actual speed ratio is near completion, a shaping function is used to reduce the desired ratio rate for a smooth ending of the ratio change mode. This is shown at 190 in FIG. 10. The offgoing clutch pressure is computed as follows:

$$PR\_CMDoc=[PR\_CMDog\_old+\Delta P(PID)*FNFRRB(ctr\_ramp)+FNPRCO(\Delta TP)+CCPRTF*(\Delta TQ\_TRANS)]*FNMLTEog(tempr), \quad (14)$$

where

| | | |
|---|---|---|
| FNFRRB(ctr_ramp) | = | multiplier used to reduce the gain of the PID controller for the first few loops, for smooth transition. It is a function of the number of loops from the start of the ratio change mode. |
| FNPRCO(ΔTP) | = | feed forward term to compensate for sudden large changes in throttle position (which are a precursor to changes of torque) |
| CCPRTF | = | constant for torque feed forward term to compensate for changes in input torque. It is activated after TMDYTQ time to allow for torque stabilization during torque modulation. |
| FNMLTEog(tempr) | = | multiplier for temperature compensation |

The $\Delta P$ (PID) term is a delta pressure calculated from the PID controller as follows:

$$\Delta P(PID)=Kc*[Kp*(RTR\_ERR\_T0-RTR\_ERR\_T1)+Ki*RTR\_ERR\_T0+Kd*(RTR\_ERR\_T0-2*RTR\_ERR\_T1+RTR\_ERR\_T2], \quad (15)$$

where

| | | |
|---|---|---|
| Kc | = | PID controller overall gain |
| Kp | = | PID controller proportional gain |
| Ki | = | PID controller integral gain |
| Kd | = | PID controller derivative gain |
| RTR_ERR | = | commanded ratio rate - actual ratio rate |
| RTR_ERR_T0 | = | control error of current loop |
| RTR_ERR_T1 | = | control error of previous loop |
| RTR_ERR_T2 | = | control error of two loops previous |

The commanded rate of ratio change described above is calculated as follows:

$$RTR\_CMD=[(1000/FNTMDSRC(VS)]*FNFRRC(RT\_NRM), \quad (16)$$

where

| | | |
|---|---|---|
| RTR_CMD | = | commanded ratio rate |
| FNTMDSRC | = | desired time in ratio change mode |
| FNFRRC | = | multiplier for shaping factor |
| RT_NRM | = | normalized ratio, value changes from 0 to 1 for an upshift |

The ratio change mode ends when the speed ratio approaches the next gear ratio for a given amount of time. If the commanded offgoing friction element pressure falls below a minimum friction element pressure, the ratio change mode is ended and the shift end mode is initiated. The ratio change mode will be aborted if it does not end in a reasonable amount of time. Control then will be passed to the shift end mode.

During the downshift, the oncoming friction element control commands a pressure for the oncoming friction element. At the beginning of the ratio change mode, the pressure is stepped up as shown at 192 in FIG. 9. The pressure continues to be elevated during the ratio change mode. The commanded pressure for the oncoming friction element, shown at 192, is calculated as follows:

$$PR\_CMDoc=[PR\_CMDoc\_old+FNPRSLRC(TP)]*FNML\text{-}TEoc(tempr), \quad (17)$$

where

| | | |
|---|---|---|
| FNPRSLRC(TP) | = | increment in pressure per loop as a function of throttle |
| FNNLTEoc(tempr) | = | multiplier for temperature compensation |

The ratio change mode for the downshift ends when the speed ratio seen in FIG. 10 gets close to the next gear ratio, seen at 193 in FIG. 10, for a given amount of time. This ratio change mode will be aborted if it does not end in a reasonable amount of time. The control then will be passed to the shift end mode.

During the downshift, the shift end mode completes the job of turning off the offgoing friction element and turning on the oncoming friction element. The pressure of the offgoing friction element at this time is computed and controlled using a closed loop PID controller. The pressure controls the speed ratio at a level that is slightly above the next gear ratio, as indicated at 194 in FIG. 10. When the oncoming friction element capacity increases, a cross-link torque feed forward term is used in the manner previously described to reduce the offgoing friction element pressure capacity in proportion to the increase in the oncoming friction element capacity. This control is similar to the offgoing friction element control during the torque transfer phase of an upshift. The friction element pressure equation for the offgoing friction element is computed as follows:

$$PR\_OGnew=[PR\_OGold+\Delta P(PID)+\Delta P(Cross\text{-}link)*FNMLFFGN(tempr)]*FNMLTEog(tempr), \quad (18)$$

where

| | | |
|---|---|---|
| FNMLTEog(tempr) | = | multiplier for temperature compensation |
| FNMLFFGN(tempr) | = | gain multiplier for the cross-linked feed forward torque |

The $\Delta P(PID)$ term is a delta pressure calculated from the PID controller as follows:

$$\Delta P(PID)=Kc*[Kp*(RT\_ERR\_T0-RT\_ERR\_T1)+Ki*RT\_ERR\_T0+Kd*(RT\_ERR\_T0-2*RT\_ERR\_T1+RT\_ER\_T2], \quad (19)$$

where

| | | |
|---|---|---|
| Kc | = | PID controller overall gain |
| Kp | = | PID controller proportional gain |
| Ki | = | PID controller integral gain |
| Kd | = | PID controller derivative gain |
| RT_ERR | = | commanded ratio - actual ratio |
| RT_ERR_T0 | = | control error of current loop |
| RT_ERR_T1 | = | control error of previous loop |
| RT_ERR_T2 | = | control error of two loops previous |

In the preceding equation (18), the term $\Delta P$ (cross_link) is a change in pressure or a delta pressure derived as a cross-linked torque open loop correction. This term is calculated as follows:

$$\Delta P(Cross\_link)=(PR\_lead/lag\_oc-PRSTog)*(GAINoc/MLTQoc)/(GAINog/MLTQog), \quad (20)$$

where $$PR\_lead/lag\_oc=PR\_ESToc\text{-}(\tau\_og/\tau\_oc)*(PR\_CMDoc-PR\_EStoc)PR\_ESToc=C*PR\_CMD\_old\_u+(1-C)*PR\_ES\text{-}ToldC=1/(1+\tau\_oc/T)$$

The term PR_ESToc is the estimated oncoming friction element pressure, assuming a first order friction element system.

The torque transfer to the oncoming friction element during a downshift is completed when the offgoing friction element can no longer maintain the ratio to the commanded value. This is illustrated at 196 in FIG. 10. The closed loop control ends when the speed ratio drops to a gear ratio within a calibratable tolerance for a given amount of time. Subsequently, the offgoing friction element pressure is completely exhausted.

As indicated in FIG. 9, the oncoming friction element goes through two phases; i.e., the torque transfer phase and the capacity increase phase. In the torque transfer phase, the commanded oncoming friction element pressure is increased, as shown at 198. The dotted line 200 in FIG. 9 illustrates how the oncoming friction element pressure is increased until the oncoming friction element pulls downs the speed ratio to the next gear ratio, shown at 193 in FIG. 10. At this point, the oncoming friction element carries most of the torque. The offgoing friction element, at that time, should be close to being completely released.

It should be noted that the offgoing friction element, as previously mentioned, is under closed loop control and its pressure is controlled to maintain a slightly higher speed ratio during the transfer phase, as shown at 194. The oncoming friction element pressure is computed at the start of the torque transfer phase as follows:

$$PR\_CMDoc=[(TQ\_TRANS+TQ\_i\alpha)*MLTQoc/GAINoc+PR\text{-}SToc-CFoc*(NT/1000)^2]*FNMLTEoc, \quad (21)$$

where

| | | |
|---|---|---|
| Cfoc | = | conversion constant for centrifugal force compensation |
| TQ_iα | = | inertial torque based on inertia, change in turbine speed, and desired ratio change time {= CONST*inertia*ΔNT/ratio change time} |
| MLTQoc | = | ratio of clutch torque to input transmission torque |
| FNMLTEoc | = | multiplier for temperature compensation |

During the subsequent control loops of the microcontroller, the commanded pressure for the oncoming friction element is slowly increased, as indicated at 198 in FIG. 9. The pressure indicated at 198 is computed as follows:

$$PR\_CMDoc = PR\_CMDoc\_old + PRSLSE + \Delta P(TQ\_FF), \quad (22)$$

where

| | | |
|---|---|---|
| PRSLSE | = | increment in clutch pressure per loop |

ΔP(TQ_FF) is a delta pressure derived as a torque feed forward open loop correction. It is calculated as follows:

$$\Delta P(TQ\_FF) = \Delta TQ\_TRANS * MLTQog/GAINog \quad (23)$$

The offgoing friction element is in closed loop control. It tries to maintain the speed ratio at a level just above the next gear ratio, shown at 193 in FIG. 10. This characteristic and the cross-link torque feed forward term provides for a smooth torque transfer from one friction element to the other.

The torque transfer phase for the oncoming friction element ends when the oncoming friction element estimated pressure (assuming a first order system) reaches the pressure required to hold the torque as the speed ratio stays within a calibratable tolerance of the next gear for a given amount of time.

The next phase of the oncoming friction element control is a capacity increase phase, indicated in FIG. 9. In this phase, the commanded oncoming friction element pressure is increased parabolically, as shown at 202, until the estimated pressure reaches approximately 90% of the commanded line pressure. The purpose of this feature is to increase the oncoming friction element pressure without an inertia torque "bump" after the oncoming friction element carries most of the torque.

As previously described with respect to an upshift, a post-shift mode for downshifts is used primarily to allow time for de-stroking the offgoing friction element and to permit the oncoming friction element pressure to rise to line pressure. It also permits post-staging of any friction element other than the two friction elements involved in the downshift that may be required for a nonsynchronous shift.

As mentioned previously, nonsynchronous downshift uses only the offgoing friction element, as distinct from a nonsynchronous upshift where the oncoming friction element is used. The shift is divided into five modes in a manner similar to the synchronous downshift.

The shift start mode consists of a capacity reduction phase and a torque transfer ramp phase, both of which behave in a manner similar to the behavior of the offgoing clutch in a synchronous downshift. The ratio change mode generates a pressure ramp in a manner similar to the offgoing friction element in a synchronous downshift.

The shift end mode during a nonsynchronous downshift is different than the shift end mode of a synchronous downshift. The commanded pressure to the offgoing friction element is decreased parabolically until it reaches zero. This is done for the purpose of decreasing the oncoming friction element pressure without an inertia torque "bump" after the friction element has released most of its torque.

Referring again to FIG. 4, the control routine of the control algorithm proceeds to steps 140 or 142 where the upshift or the downshift is processed, the output duty cycles 104 and 106 in FIG. 3 are determined in accordance with the following equation:

$$DC\_CL = FNPRDCCL(PR\_CMDcl/PR\_EST\_LN) + FNPRDCDL\_CL(PR\_CMDcl/PR\_EST\_LN, TEMPERATURE) \quad (24)$$

The commanded pressure is converted to a corresponding duty cycle by dividing the friction element pressure by estimated line pressure to get a fractional pressure, as indicated in the preceding equation. The duty cycle then is obtained using a lookup duty cycle versus fractional pressure function for the solenoid valve.

A temperature compensation term for the duty cycle indicated in the preceding equation (24) is obtained by finding the delta duty cycle from a lookup table based on transmission oil temperature and fractional desired pressure. It should be remembered, as indicated earlier, that the solenoids could be either pulsewidth modulated solenoids or variable force solenoids. In the case of a variable force solenoid control system, a variable force solenoid current would be established rather than a duty cycle.

Referring again to the algorithm chart of FIG. 4, the control routine will determine in each control loop of the microcontroller whether the driver has a change of mind during the progression of an upshift or a downshift. A change of mind shift, as indicated at 204 in FIG. 4 occurs if the driver significantly changes the accelerator pedal position during processing of an upshift or a downshift. This results in a different desired gear than the gear currently being executed.

A so-called change of mind shift can either be in a direction opposite to the direction of the current shift or in the same direction as the direction of the current shift. The processing of the change of mind shift occurs at step 206 in FIG. 4.

The duty cycles for steps 140, 142 and 206 are output at step 208 in FIG. 4.

Figure 11:
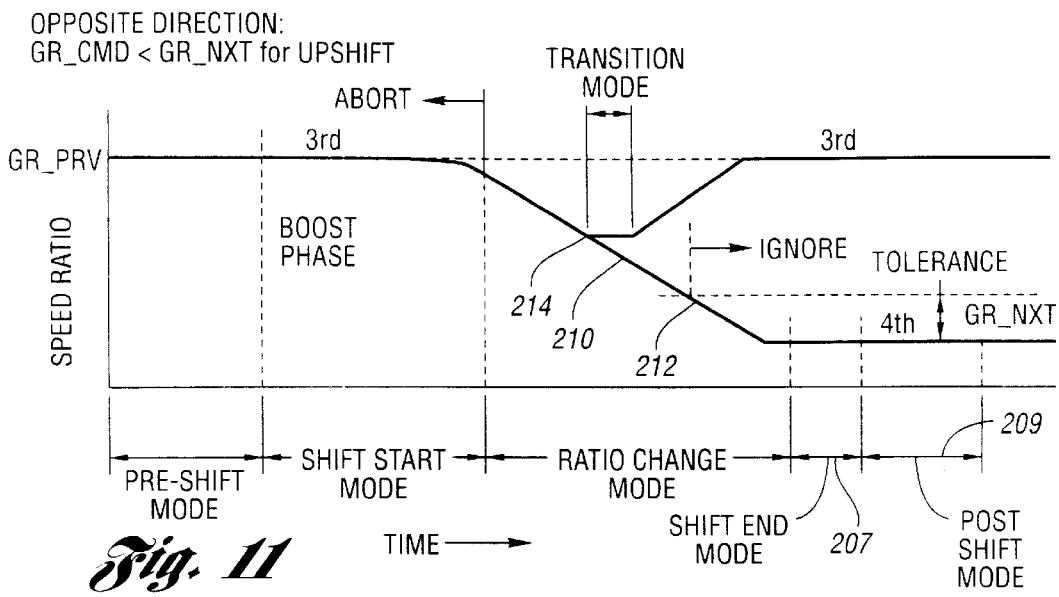
FIG. 11 is a plot of the speed ratio and timing versus shift time for the various ratio changing modes occur as the operator interrupts the shift before shift completion.
Figure 12:
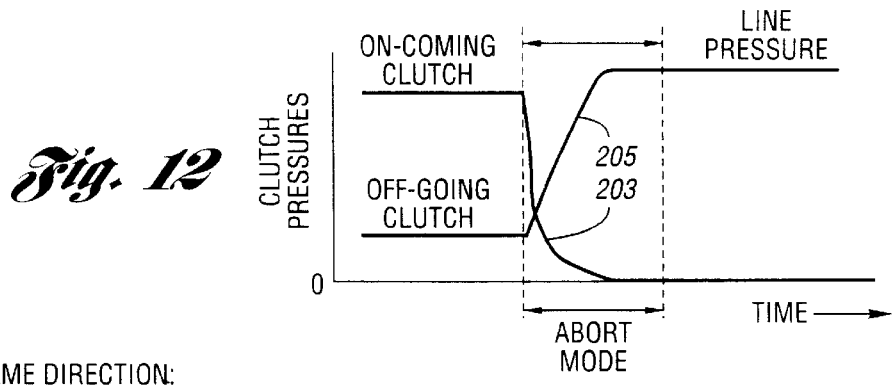
FIG. 12 is a plot showing the oncoming friction element pressure and the offgoing friction element pressure following interruption of an upshift or a downshift before shift completion.

In the case of a change of mind shift in the opposite direction of the current shift, the new desired gear is the same as the previous gear (e.g., fourth gear) or beyond it in the opposite direction (e.g., third gear). For example, if a 3-4 shift is in progress, and during the shift the driver steps into the throttle, the new desired gear could be third or second gear, depending on the shift schedule. The following logic is executed depending upon the current shift mode:

If the shift is in the shift start or pre-shift modes, the shift will be aborted and the transmission returns to the previous gear. This is shown in FIG. 11. A calibratable time is allowed for friction element pressure at the oncoming friction element to decay. This is shown in FIG. 12 at 203. Further, the offgoing friction element pressure will rise over a calibratable time as shown at 205. If the shift is in the shift end or post-shift mode, as shown at 207 and 209 in FIG. 11, the change of mind request is ignored and the current gear continues to the end, as indicated in FIG. 11. If the shift is in the ratio change mode, on the other hand, the ratio change mode being shown at 210 in FIG. 11, the change of mind is handled in one of two ways. First, if the speed ratio has reached a level within a calibratable tolerance of the next gear ratio, then the current shift is completed. That point is shown in FIG. 11 at 212. Second, if the speed ratio is not near completion, the oncoming friction element and the offgoing friction element are exchanged. The appropriate pressures are commanded for the oncoming friction element and the offgoing friction element based on the input torque with a calibratable amount of time allowed for pressures to reach the commanded values. The ratio change backtracks to the previous gear using a closed loop controller. The time at which this occurs is shown at 214 in FIG. 11. The controller in effect will go back to where it started. This is a command for a downshift.

Figure 13:
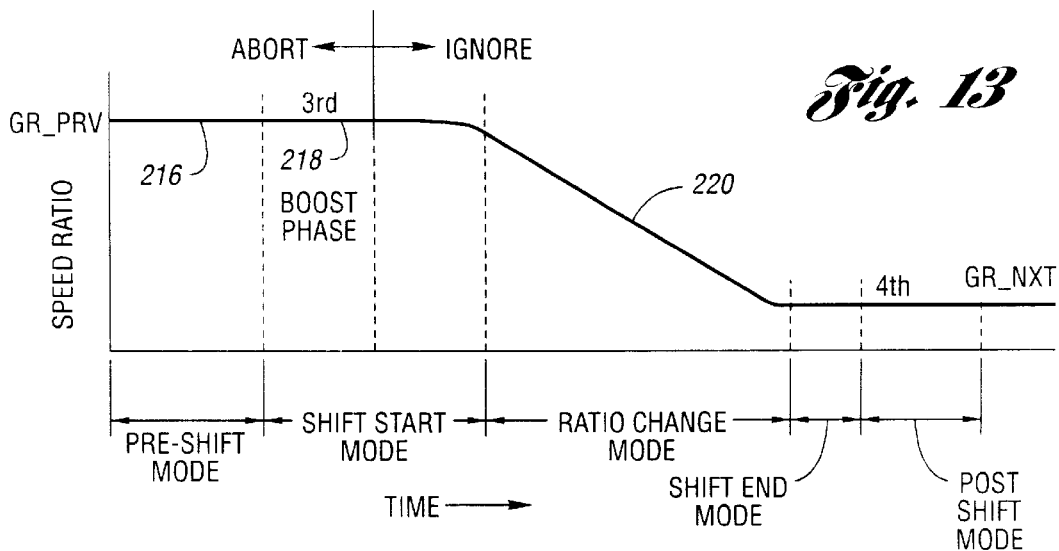
FIG. 13 is a plot of the speed ratio versus shift time as the gearing shifts from a low ratio to a higher ratio.

If the change of mind shift is in the same direction as the direction of the current shift, the new desired gear is beyond the next gear in the same direction. For example, if the vehicle is in third gear and a 3-4 shift is in progress, then during the 3-4 upshift the driver backs out the throttle even more, whereby the fifth gear is desired, the following logic is executed depending upon the current shift mode:

If the shift is in the pre-shift mode or in the boost phase of the shift start mode, as indicated respectively at 216 and 218 of FIG. 13, the shift will be aborted and the transmission will return to the previous gear and another shift to the commanded gear is initiated. If the shift is beyond the boost phase, shown at 218 in FIG. 13, the current shift is completed normally (see the ratio change mode at 220 in FIG. 13). Immediately after the end of the current shift, another shift is initiated to the new commanded gear (e.g., second gear).

Although a preferred embodiment of the invention has been disclosed, it will be apparent to persons skilled in the art that modifications may be made without departing from the scope of the invention. All such modifications and equivalents thereof are within the scope of the following claims.

What is claimed is:

1. A method and strategy for controlling engagement and release of friction elements of a multiple ratio automatic transmission in an automotive vehicle powertrain with a throttle-controlled internal combustion engine, the transmission having pressure-operated friction clutch and brake elements, an electronic controller having signal input portions and output driver portions, a pressure control circuit including solenoid valve actuators communicating with the friction elements and with the output driver portions, and gearing controlled by the friction clutch and brake elements to establish plural torque flow paths from the engine to vehicle traction wheels, the signal input portions of the electronic controller being in communication with sensors for measuring powertrain variables including engine speed, output shaft speed, engine throttle position and transmission speed ratio range selection, the method and strategy comprising the steps of:

determining input variables for the electronic controller by reading and processing signals from the sensors;

computing a friction element capacity reduction for the offgoing friction element on a ratio upshift during a shift start mode;

maintaining a pressure on the oncoming friction element sufficient to initiate engagement of the oncoming friction element;

increasing the oncoming clutch pressure during a torque transfer phase as a function of torque ratio of friction element torque to input torque and clutch gain;

controlling the oncoming and offgoing clutch pressures to effect a calibrated speed ratio rate of change from the previous ratio to the next ratio as a function of throttle position during a ratio change mode; and controlling the oncoming friction element using a closed loop control to obtain a speed ratio change rate of a calibrated value during the ratio change mode.

2. A method and strategy for controlling engagement and release of friction elements of a multiple ratio automatic transmission in an automotive vehicle powertrain with a throttle-controlled internal combustion engine, the transmission having pressure-operated friction clutch and brake elements, an electronic controller having signal input portions and output driver portions, a pressure control circuit including solenoid valve actuators communicating with the friction elements and with the output driver portions, and gearing controlled by the friction clutch and brake elements to establish plural torque flow paths from the engine to vehicle traction wheels, the signal input portions of the electronic controller being in communication with sensors for measuring powertrain variables including engine speed, output shaft speed, engine throttle position and transmission speed ratio range selection, the method and strategy comprising the steps of:

determining input variables for the electronic controller by reading and processing signals from the sensors;

computing a friction element capacity reduction for the offgoing friction element on a ratio upshift during a shift start mode;

maintaining a pressure on the oncoming friction element sufficient to initiate engagement of the oncoming friction element;

increasing the oncoming clutch pressure during a torque transfer phase as a function of torque ratio of friction element torque to input torque and clutch gain;

controlling the oncoming and offgoing clutch pressures to effect a calibrated speed ratio rate of change from the previous ratio to the next ratio as a function of throttle position during a ratio change mode; and controlling the oncoming friction element using a closed loop control to obtain a speed ratio change rate of a calibrated value during the ratio change mode;

wherein oncoming clutch pressure is computed as follows:

$$PR\_CMDoc = \{PR\_CMDoc\_old + \Delta P(PID) * FNFRRB(ctr\_ramp) + FNPRCO(\Delta TP) + CCPRTF * (\Delta TQ\_TRANS) + [TQ\_i\alpha(1 - FRTRoc) * MLTQoc * FRPRDLoc/GAINoc]\} * FNMLTEoc(tempr),$$

where

| | |
|---|---|
| $FNFRRB(ctr\_ramp)$ = | multiplier used to reduce the gain of the PID controller for the first few loops for smooth transition and it is a function of the number of loops from the start of the ratio change mode; |

-continued

| | | |
|---|---|---|
| FNPRCO(ΔTP) | = | feed forward term to compensate for sudden large changes in throttle position (which are a precursor to changes of torque); |
| CCPRTF | = | constant for torque feed forward term to compensate for changes in input torque, it being activated after TMDYTQ time to allow for torque stabilization during torque modulation; |
| FRPRDLoc | = | percent increment per loop until pressure needed due to remainder of 1-alpha torque is take care of, a portion of 1-alpha torque is already added during torque transfer phase; |
| FNMLTEoc(tempr) | = | multiplier for temperature compensation. |

3. A method and strategy for controlling engagement and release of friction elements of a multiple ratio automatic transmission in an automotive vehicle powertrain with a throttle-controlled internal combustion engine, the transmission having pressure-operated friction clutch and brake elements, an electronic controller having signal input portions and output driver portions, a pressure control circuit including solenoid valve actuators communicating with the friction elements and with the output driver portions, and gearing controlled by the friction clutch and brake elements to establish plural torque flow paths from the engine to vehicle traction wheels, the signal input portions of the electronic controller being in communication with sensors for measuring powertrain variables including engine speed, output shaft speed, engine throttle position and transmission speed ratio range selection, the method and strategy comprising the steps of:

determining input variables for the electronic controller by reading and processing signals from the sensors;

computing a friction element capacity reduction for the offgoing friction element on a ratio upshift during a shift start mode;

maintaining a pressure on the oncoming friction element sufficient to initiate engagement of the oncoming friction element:

increasing the oncoming clutch pressure during a torque transfer phase as a function of torque ratio of friction element torque to input torque and clutch gain;

controlling the oncoming and offgoing clutch pressures to effect a calibrated speed ratio rate of change from the previous ratio to the next ratio as a function of throttle position during a ratio change mode; and controlling the oncoming friction element using a closed loop control to obtain a speed ratio change rate of a calibrated value during the ratio change mode;

wherein offgoing clutch pressure is computed as follows:

$$PR\_CMDoc=[PR\_CMDog\_old+\Delta P(PID)*FNFRRB(ctr\_ramp)+FNPRCO(\Delta TP)+CCPRTF*(\Delta TQ\_TRANS)]*FNMLTEog(tempr),$$

where

| | | |
|---|---|---|
| FNFRRB(ctr_ramp) | = | multiplier used to reduce the gain of the PID controller for the first few loops, for smooth transition, and is a function of the number of loops from the start of the ratio change mode; |
| FNPRCO(ΔTP) | = | feed forward term to compensate for sudden large changes in throttle position (which are a precursor to changes of torque); |
| CCPRTF | = | constant for torque feed forward term to compensate for changes in input torque and is activated after TMDYTQ time to allow for torque stabilization during torque modulation; |
| FNMLTEog(tempr) | = | multiplier for temperature compensation. |

4. A method and strategy for controlling engagement and release of friction elements of a multiple ratio automatic transmission in an automotive vehicle powertrain with a throttle-controlled internal combustion engine, the transmission having pressure-operated friction clutch and brake elements, an electronic controller having signal input portions and output driver portions, a pressure control circuit including solenoid valve actuators communicating with the friction elements and with the output driver portions, and gearing controlled by the friction clutch and brake elements to establish plural torque flow paths from the engine to vehicle traction wheels, the signal input portions of the electronic controller being in communication with sensors for measuring powertrain variables including engine speed, output shaft speed, engine throttle position and transmission speed ratio range selection, the method and strategy comprising the steps of:

determining input variables for the electronic controller by reading and processing signals from the sensors;

computing a friction element capacity reduction for the offgoing friction element on a ratio upshift during a shift start mode;

maintaining a pressure on the oncoming friction element sufficient to initiate engagement of the oncoming friction element;

increasing the oncoming clutch pressure during a torque transfer phase as a function of torque ratio of friction element torque to input torque and clutch gain;

controlling the oncoming and offgoing clutch pressures to effect a calibrated speed ratio rate of change from the previous ratio to the next ratio as a function of throttle position during a ratio change mode; and controlling the oncoming friction element using a closed loop control to obtain a speed ratio change rate of a calibrated value during the ratio change mode;

reducing the total shift time by reducing the torque capacity of the offgoing clutch during an upshift to a value slightly greater than the value necessary to hold engine torque by reducing offgoing friction element pressure to a pressure that is a function of engine torque;

entering an incipient capacity phase after the commanded offgoing clutch pressure reaches a target pressure; and controlling the offgoing friction element pressure with a closed loop control in proportion to the gain in capacity of the oncoming clutch.

5. The method and strategy set forth in claim 4 including the step of setting the pressure of the offgoing friction element to the pressure needed to initiate engagement of the offgoing friction element begins to slip and the speed ratio rises above the previous gear ratio by a calibrated value.

6. A method and strategy for controlling engagement and release of friction elements of a multiple ratio automatic transmission in an automotive vehicle powertrain with a throttle-controlled internal combustion engine, the transmission having pressure-operated friction clutch and brake elements, an electronic controller having signal input portions and output driver portions, a pressure control circuit including solenoid valve actuators communicating with the friction elements and with the output driver portions, and gearing controlled by the friction clutch and brake elements to establish plural torque flow paths from the engine to vehicle traction wheels, the signal input portions of the electronic controller being in communication with sensors for measuring powertrain variables including engine speed, output shaft speed, engine throttle position and transmission speed ratio range selection, the method and strategy comprising the steps of:

determining input variables for the electronic controller by reading and processing signals from the sensors;

reducing the torque capacity of the offgoing friction element during a downshift to a target value slightly great enough to hold engine torque as a function of engine torque; and decreasing the offgoing friction element pressure during a torque ramp phase during a downshift after the target value is reached, the decreasing of pressure continuing until the offgoing friction element begins to slip and the speed ratio rises above the previous gear ratio by a calibrated value;

boosting the oncoming friction element pressure during a downshift to a commanded maximum pressure for a short period of time that is a function of clutch supply pressure and transmission and temperature;

controlling the offgoing friction element during a downshift with a closed loop control to control the speed ratio rate of change to a calibrated value as a function of vehicle speed during a speed ratio change mode;

ending the speed ratio change made when the commanded offgoing clutch pressure falls below a minimum calibrated friction element pressure; and increasing the oncoming friction element pressure during the speed ratio change mode until the speed ratio value is approximately at the next speed ratio for a given amount of time.

7. The method and strategy set forth in claim 6 including the step of controlling the offgoing friction element pressure in a closed loop fashion during a downshift as the speed ratio is held at a value slightly greater than the next speed ratio;

reducing the offgoing friction element capacity in proportion to the oncoming clutch capacity gain during a downshift.

8. The method and strategy set forth in claim 7 including the step of ending the closed loop control of the offgoing clutch during a downshift when the speed ratio drops to a value near the next speed ratio.

9. The method and strategy set forth in claim 8 including the step of increasing the commanded oncoming friction element pressure during a downshift until the oncoming friction element decreases the speed ratio to the next speed ratio.

* * * * *